(12) United States Patent
Liu

(10) Patent No.: US 9,537,559 B1
(45) Date of Patent: Jan. 3, 2017

(54) AUTONOMOUS RADIO CONTROLLING METHOD AND SYSTEM THEREOF

(71) Applicant: ACCTON TECHNOLOGY CORPORATION, Hsinchu (TW)

(72) Inventor: I-Ru Liu, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/080,602

(22) Filed: Mar. 25, 2016

(30) Foreign Application Priority Data

Aug. 17, 2015 (TW) .............................. 104126715 A

(51) Int. Cl.
| | | |
|---|---|---|
| H04B 7/00 | (2006.01) | |
| H04B 7/08 | (2006.01) | |
| H04L 1/06 | (2006.01) | |
| H04L 1/20 | (2006.01) | |

(52) U.S. Cl.
CPC ............ *H04B 7/0814* (2013.01); *H04B 7/082* (2013.01); *H04B 7/0808* (2013.01); *H04B 7/0871* (2013.01); *H04B 7/0874* (2013.01); *H04L 1/06* (2013.01); *H04L 1/20* (2013.01)

(58) Field of Classification Search
CPC ........... H04B 7/04; H04B 7/0413; H04B 7/08; H04B 7/0868; H04B 7/0871; H04B 7/0874; H04B 7/0891; H04L 1/02; H04L 1/06; H04L 1/20; H04L 1/203
USPC ........................... 455/272, 273, 277.1, 277.2
See application file for complete search history.

(56) References Cited

U.S. PATENT DOCUMENTS

| | | | | |
|---|---|---|---|---|
| 6,118,773 A * | 9/2000 | Todd | .................... | H04B 7/0808 370/334 |
| 6,266,528 B1 * | 7/2001 | Farzaneh | ............. | H04B 17/318 342/173 |
| 6,801,790 B2 * | 10/2004 | Rudrapatna | ............ | H01Q 1/246 342/374 |
| 6,917,820 B2 * | 7/2005 | Gore | .................... | H04B 7/0874 370/334 |
| 7,050,832 B2 * | 5/2006 | Kasapi | ................. | H04B 7/0689 455/273 |
| 7,395,084 B2 * | 7/2008 | Anttila | ..................... | H01Q 1/28 342/417 |
| 7,570,620 B2 * | 8/2009 | Miyata | .................. | H04W 24/00 370/328 |
| 9,288,688 B2 * | 3/2016 | Kim | ..................... | H04W 16/28 |

(Continued)

*Primary Examiner* — Duc M Nguyen
(74) *Attorney, Agent, or Firm* — CKC & Partners Co., Ltd.

(57) ABSTRACT

An autonomous radio controlling method and a system thereof are disclosed herein, in which the autonomous radio controlling method includes: antenna combinations of an antenna matrix are switched. Signal-to-interference ratios (SIRs) and received signal strength indicator (RSSI) values of the antenna combinations are respectively through a first computing process to generate first computed SIRs and first computed RSSI values. The SIRs are through a second computing process to generate second computed SIRs. A relation between a minimum of the second computed SIRs and a first threshold is determined, and further a relation between a minimum of the first computed SIRs and a first range, or a relation between a minimum of the first computed RSSI value and a second range is determined to control an autonomous radio system to operate in a first mode or a second mode.

12 Claims, 7 Drawing Sheets

(56) References Cited

U.S. PATENT DOCUMENTS

| | | | | |
|---|---|---|---|---|
| 2002/0193146 | A1* | 12/2002 | Wallace | H04B 7/0417 455/562.1 |
| 2003/0228857 | A1* | 12/2003 | Maeki | H01Q 1/246 455/278.1 |
| 2004/0219899 | A1* | 11/2004 | Ho | H04B 7/0842 455/273 |

* cited by examiner

AUTONOMOUS RADIO CONTROLLING METHOD AND SYSTEM THEREOF

RELATED APPLICATIONS

This application claims priority to Taiwanese Application Serial Number 104126715, filed Aug. 17, 2015, which is herein incorporated by reference.

BACKGROUND

Field of Invention

The present invention relates to a control technology. More particularly, the present invention relates to an autonomous radio controlling method and a system thereof.

Description of Related Art

Recently, developed technology of multi-input multi-output (MIMO) system mostly utilizes a structure of dumb antenna system or structure of an adaptive antenna system. In the dumb antenna system, there is a fixed corresponding relation between the number of antennas and the number of transceivers, which can only meet general MIMO requirements. More antennas can be included in the adaptive antenna system, and thus a better signal can be selected to send to transceivers through a beam processing network. However, lots of antennas in the aforementioned two antenna systems are needed to be arranged in a fixed rule, such as staggered arrangement, a stacked arrangement or a staggered-stacked arrangement, which results in some limitations in hardware arrangement or range of application. Moreover, the antennas must have known properties (e.g., working frequency band, normal function or malfunction, directions of polarization, etc). Therefore, if an unknown antenna appears in the antenna system, or a malfunction occurs in an antenna of the antenna system, normal functions of the antenna system would be affected.

SUMMARY

In order to improve flexibility of multi-input multi-output (MIMO) system application, the present disclosure provides an autonomous radio controlling method, which includes following steps. A plurality of antenna combinations in an antenna array are switched to obtain the information of the antenna parameters corresponding to the antenna combinations. A plurality of signal-to-interference ratios (SIRs) and a plurality of received signal strength indicator (RSSI) values of the antenna combinations are processed through a first computing process respectively to generate a plurality of first computed SIRs and a plurality of first computed RSSI values. The SIRs are processed through a second computing process additionally to generate a plurality of second computed SIRs. A relation between a minimum of the second computed SIRs and a first threshold value is determined. If the minimum of the second computed SIRs is lower than the first threshold value, a relation between a minimum of the first computed SIRs and a first range is further determined. If the minimum of the first computed SIRs is higher than the first range, an autonomous radio system is controlled to operate in a first mode. If the minimum of the first computed SIRs is lower than the first range, an autonomous radio system is controlled to operate in a second mode. If the minimum of the second computed SIRs is higher than the first threshold value, a relation between a minimum of the first computed RSSI values and a second range is further determined. If the minimum of the first computed RSSI values is higher than the second range, the autonomous radio system is controlled to operate in the first mode. If the minimum of the first computed RSSI values is lower than the second range, the autonomous radio system is controlled to operate in the second mode.

In an embodiment of the present disclosure, the RSSI value is processed through the second computing process to generate a plurality of second computed RSSI values. If the minimum of the first computed RSSI values is within the second range, a relation between a maximum of the second computed RSSI values and a third range is further determined. If the maximum of the second computed RSSI values is higher the third range, the autonomous radio system is controlled to operate in the second mode. If the maximum of the second computed RSSI values is lower than the third range, the autonomous radio system is controlled to operate in a third mode.

In an embodiment of the present disclosure, a plurality of data rates (DRs) of the antenna combinations are processed through the first computing process to generate a plurality of first computed DRs. If the maximum of the second computed RSSI values is within the third range, a relation between a minimum of the first computed DRs and a fourth range is further determined. If the minimum of the first computed DRs is higher than the fourth range, the autonomous radio system is controlled to operate in a fourth mode. If the minimum of the first computed DRs is lower than the fourth range, the autonomous radio system is controlled to operate in the second mode.

In an embodiment of the present disclosure, the DRs are processed through the second computing process to generate a plurality of second computed DRs. If the minimum of the first computed DRs is within the fourth range, a relation between a maximum of the second computed DRs and a second threshold value is further determined. If the maximum of the second computed DRs is higher than the second threshold value, the autonomous radio system is controlled to operate in the second mode. If the maximum of the second computed DRs is lower than the second threshold value, the autonomous radio system is controlled to operate in a fifth mode.

In an embodiment of the present disclosure, wherein the first mode is a spatial diversity (SD) mode, the second mode is a large-number stream spatial multiplexing (SM) mode, the third mode is a single stream beam forming (BF) mode, the fourth mode is a small-number stream spatial multiplexing mode, and the fifth mode is a medium-number stream spatial multiplexing mode.

In an embodiment of the present disclosure, if the minimum of the first computed SIRs is within the first range, a relation between a maximum of the second computed SIRs and a fifth range is further determined. If the maximum of the second computed SIRs is higher than the fifth range, the autonomous radio system is controlled to operate in the second mode. If the maximum of the second computed SIRs is lower than the fifth range, the autonomous radio system is controlled to operate in a third mode.

In an embodiment of the present disclosure, a plurality of DRs of the antenna combinations are processed through the first computing process to generate a plurality of first computed DRs. If the maximum of the second computed SIRs is within the fifth range, a relation between a minimum of the first computed DRs and a fourth range is further determined. If the minimum of the first computed DRs is higher than the fourth range, the autonomous radio system is controlled to operate in a fourth mode. If the minimum of the first computed DRs is lower than the fourth range, the autonomous radio system is controlled to operate in the second mode.

In an embodiment of the present disclosure, the DRs is processed through the second computing process to generate a plurality of second computed DRs. If the minimum of the first computed DRs is within the fourth range, a relation between a maximum of the second computed DRs and a second threshold value is further determined. If the maximum of the second computed DRs is higher than the second threshold value, the autonomous radio system is controlled to operate in the second mode. If the maximum of the second computed DRs is lower than the second threshold value, the autonomous radio system is controlled to operate in a fifth mode.

In an embodiment of the present disclosure, wherein the first computing process is a computation of root mean square deviation, and the second computing process is a computation of mean.

In an embodiment of the present disclosure, wherein the first computing process is a computation of maximum difference, and the second computing process is a computation of minimum.

Another aspect of the present application provides an autonomous radio system, which includes a beam processing network (BPN) and an access point device. The beam processing network (BPN) is configured to switch a plurality of antenna combinations in an antenna array. The access point device is coupled to the BPN and configured to execute following steps. A plurality of signal-to-interference ratios (SIRs) and a plurality of received signal strength indicator (RSSI) values of the antenna combinations are processed through a first computing process respectively to generate a plurality of first computed SIRs and a plurality of first computed RSSI values. The SIRs are processed through a second computing process to generate a plurality of second computed SIRs. A relation between a minimum of the second computed SIRs and a first threshold value is determined. If the minimum of the second computed SIRs is lower than the first threshold value, a relation between a minimum of the first computed SIRs and a first range is further determined. If the minimum of the first computed SIRs is higher than the first range, an autonomous radio system is controlled to operate in a first mode. If the minimum of the first computed SIRs is lower than the first range, an autonomous radio system is controlled to operate in a second mode. If the minimum of the second computed SIRs is higher than the first threshold value, a relation between a minimum of the first computed RSSI values and a second range is further determined. If the minimum of the first computed RSSI values is higher than the second range, the autonomous radio system is controlled to operate in the first mode. If the minimum of the first computed RSSI values is lower than the second range, the autonomous radio system is controlled to operate in the second mode.

In conclusion, the present disclosure can execute categorizations of reliability and quality on the antenna combinations according to the computed SIRs and the computed RSSI values of different antenna combinations in the antenna array, and control the autonomous radio system to operate in a corresponding operation mode according to the categorizations, in order to adapt to variable environment conditions flexibly.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise.

In this document, the term "coupled" may also be termed as "electrically coupled", and the term "connected" may be termed as "electrically connected". "coupled" and "connected" may also be used to indicate that two or more elements cooperate or interact with each other.

Figure 1:
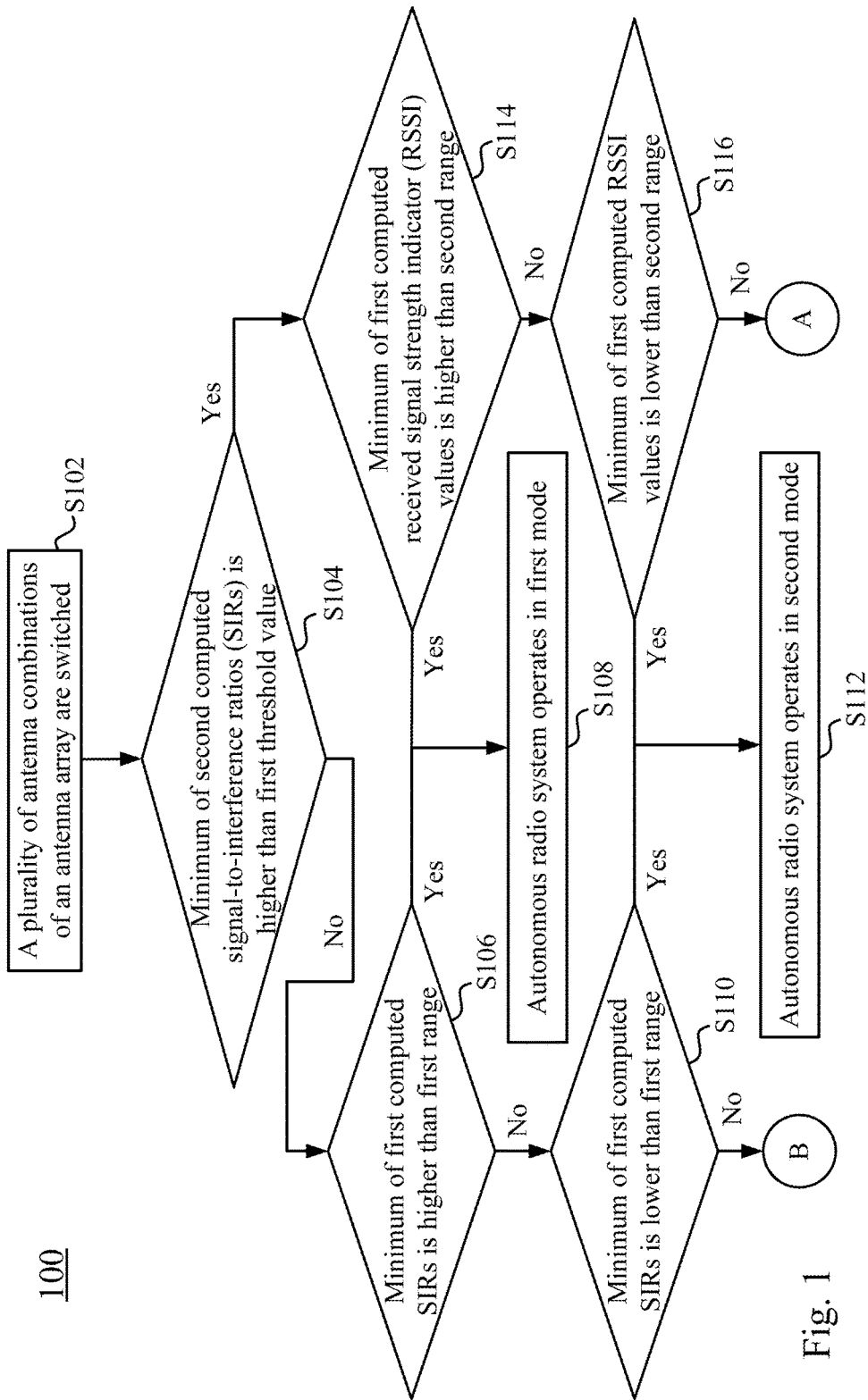
FIG. 1 is a flow chart of an autonomous radio controlling method for a multi-input multi-output (MIMO) array matrix according to an embodiment of the present disclosure.
Figure 5:
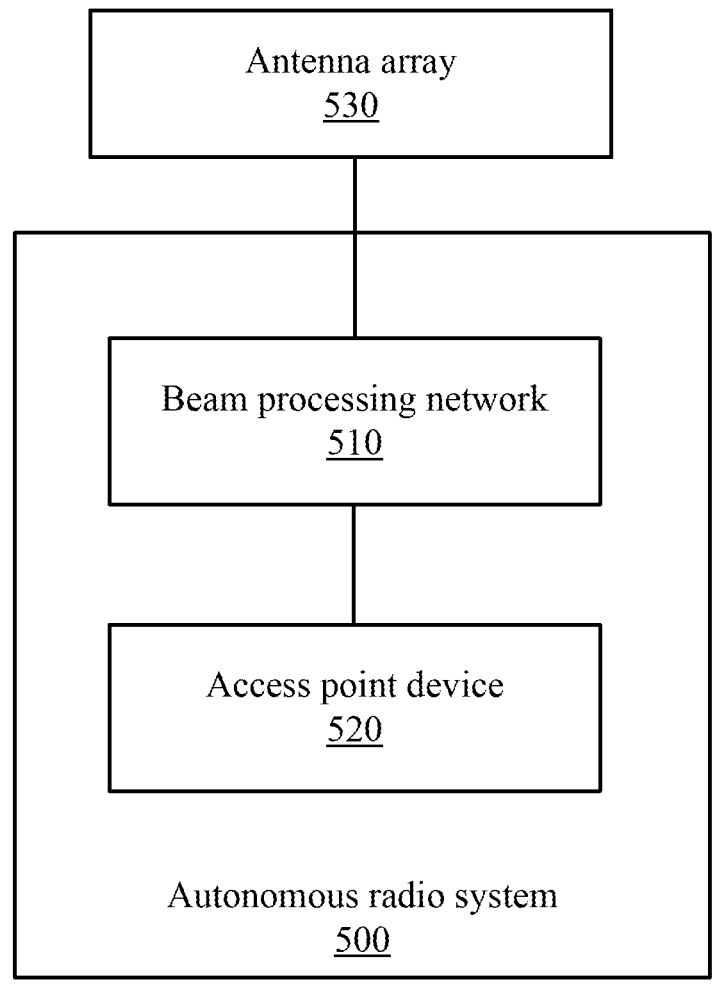
FIG. 5 is a schematic diagram of an autonomous radio system according to an embodiment of the present disclosure.
Figure 6:
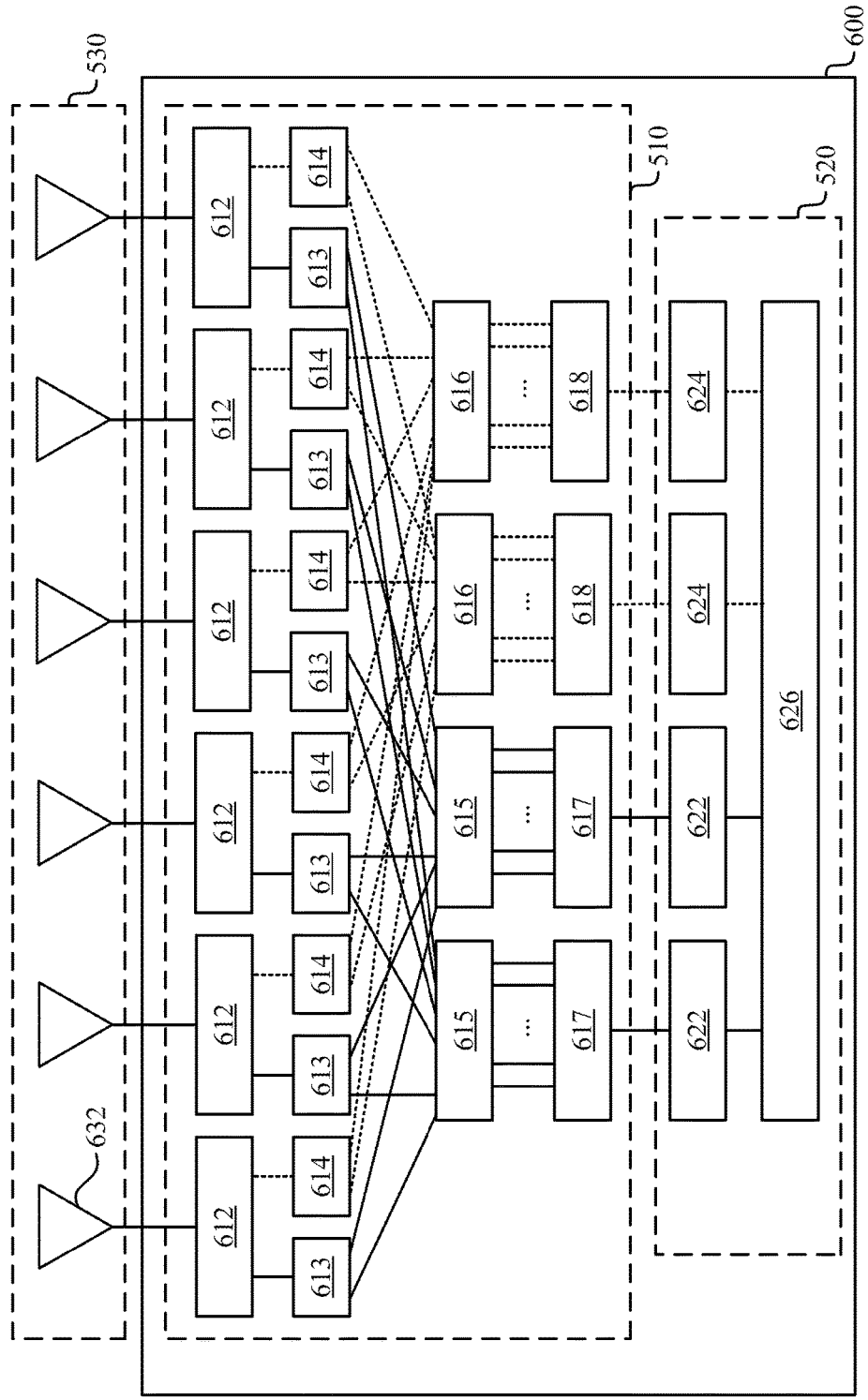
FIG. 6 is a schematic diagram of an autonomous radio system according to an embodiment of the present disclosure.

Please refer to FIG. 1. FIG. 1 is a flow chart of an autonomous radio controlling method for a multi-input multi-output (MIMO) array matrix according to an embodiment of the present disclosure. The autonomous radio controlling method 100 includes a plurality of steps S102-S112 and can be implemented by autonomous radio systems 500, 600 as shown in FIGS. 5 and 6. However, those skilled in the art should understand that the sequence of the steps in the present embodiment can be adjusted according to actual needs unless is specified. All or parts of the steps can even be executed simultaneously.

First, in step S102, a plurality of antenna combinations of an antenna array is switched or scanned. More specifically, connection combinations of a plurality of antenna and a plurality of transceivers are switched. For example, if number of antennas of an antenna array is a positive integer M, and number of transceivers of an autonomous radio system is a positive integer N, thus number of antenna combinations is number of all combination situations that N transceivers select N antennas from the M antennas for connection.

Therefore, the number of the antenna combinations is combination (M, N). Generally, the positive integer M is higher than or equal to the positive integer N. When all possible antenna combinations are switched one by one, a computed received signal strength indicator (RSSI) value is computed according to a RSSI value of every antenna in the antenna combinations, and the computed RSSI value represents characteristics of every antenna combination. For example, computed RSSI value can be a sum, a mean, a root mean square deviation (RMSD), a normalized RMSD, a minimum, a maximum difference, or a normalized maximum difference of every antenna RSSI value in the antenna combination, or other computed values according to the RSSI values. For example, the aforementioned normalized RMSD of the RSSI values is every RMSD of the RSSI values of the antenna combination divided by a mean of the RSSI values. The aforementioned normalized maximum difference of the RSSI values is every maximum difference of the RSSI values of the antenna combinations divided by a means of the RSSI values.

Moreover, a signal-to-interference ratio (SIR) of every antenna is computed through dividing every RSSI value by a noise floor (NF) value (or a background noise, noise data of the antennas). Similarly, when all of the possible antenna combinations are switched one by one, a corresponding computed SIR is computed according to the SIRs of the antennas in every antenna combination, and the computed SIR also indicates characteristics of every antenna combination. For example, the computed SIR can be a sum, a mean, a RMSD, a normalized RMSD, a minimum, a maximum difference, or a normalized maximum difference of every antenna SIR in the antenna combination. For example, the aforementioned normalized RMSD of the SIRs is every SIR of the SIRs of the antenna combination divided by a mean of the SIRs. The aforementioned normalized maximum difference of the SIRs is every maximum difference of the SIRs of the antenna combinations divided by a mean of the SIRs.

In step 104, first, main consideration is interference immunity of signal quality, and means of SIRs are conditions for determination, i.e., the means of the SIRs of every antenna combination are second computed SIRs. When a minimum of the means of the SIRs of every antenna combination is lower than first threshold value TH0 (e.g., 46 dB), it indicates that interference immunity of the present antenna combination is not good. Therefore, in step S106, in order to improve compatibility reliability of signal reliability, RMSDs of SIRs of every antenna combination are conditions for determination, i.e., the RMSDs of the SIRs of every antenna combination are first computed SIRs. When a minimum of the RMSDs of the SIRs of the antenna combination is higher than first range, i.e., the minimum is higher than an upper limit HTH1-1 (e.g., 20 dB) of the first range, it indicates that compatibility reliability of the present antenna combination is not good. Therefore, in step S108, the autonomous radio system selects an antenna combination with the minimum of the RMSDs of the SIRs, and operates in a single stream spatial diversity (SD) mode (first mode). In single stream, all of the antennas are controlled to send the same signal. The present embodiment can check whether interference exists through the RMSDs of the SIRs and operate in the SD mode to use antenna defects or channel deep fade effect in order to eliminate interference. That is, the antenna defects or destructive interference is used to eliminate effect on the antenna from interference sources.

If in the step S106, the minimum of RMSDs of the SIRs is not higher than the first range, i.e., the minimum is lower than the upper limit HTH1-1 of the first range, then in step S110, a determination is made whether the minimum of the RMSDs of the SIRs is lower than the first range. If the minimum of the RMSDs of the SIRs is lower than the first range, i.e., the minimum is lower than a lower limit LTH2-1 (e.g., 10 dB) of the first range, it indicates that compatibility reliability of the present antenna combination is good. Therefore, in step S112, the autonomous radio system selects an antenna combination with the minimum of the RMSDs of the SIRs, and operates in a large-number stream spatial multiplexing (SM) mode (second mode), i.e., a high-rank MIMO mode (e.g., a spatial multiplexing (SM) mode that numbers of transmit antennas and receive antennas are 4 (4×4 SM), but the present disclosure is not limited to the numbers). Under the operation mode (SM mode), different antenna combinations can be controlled to transport different signals.

On the other hand, if in the step S104, the minimum of the means of the SIRs is higher than the first threshold value TH0, it indicates that interference immunity of the present antenna combination is good. Therefore, in step S114, in order to improve coverage reliability of signal reliability, RMSDs of the RSSI values are conditions for determination, i.e., RMSDs of the RSSI values of every antenna combination are first computed RSSI values. When a minimum of the RMSDs of the RSSI value of every antenna combination is higher than a second range, i.e., the minimum is higher than an upper limit HTH1-2 (e.g., 20 dB) of the second range, it indicates that coverage reliability of the present antenna combination is not good. Therefore, in step S108, the autonomous radio system selects an antenna combination with the minimum of the RMSDs of the RSSI values, and operates in the single stream SD mode (first mode). The present embodiment can check whether the antennas have defects (because the antennas are disabled or blocked) through RMSDs of the RSSI values, and/or if channel deep fade effect (because of strong destructive interference) happens, and operate in the SD mode to avoid target-losing (e.g., losing the client), that is, avoid that a communication target loses contact because of the antenna defects or destructive interference.

If in the step S114, the minimum of the RMSDs of the RSSI values is not higher than the second range, i.e., the minimum is lower than the upper limit HTH1-2 of the second range, then in step S116, a determination is made whether the minimum of the RMSDs of the RSSI values is lower than the second range. If the minimum of the RMSDs of the RSSI values is lower than the second range, i.e., the minimum is lower than a lower limit LTH2-2 (e.g., 10 dB) of the second range, it indicates that coverage reliability of the present antenna combination is good. Therefore, in the step S112, the autonomous radio system selects an antenna combination with the minimum of the RMSDs of the RSSI values, and operates in the large-number stream spatial multiplexing (SM) mode (second mode), i.e., the high-rank MIMO mode (e.g., a spatial multiplexing (SM) mode that numbers of transmit antennas and receive antennas are 4 (4×4 SM)).

In the present embodiment, first computing process is a computation of RMSD, and second computing process is a computation of mean. The computed RMSDs and the computed means in the autonomous radio control method 100 are for illustrative purposes only, and other appropriate computed values are also within the scope of the present disclosure. Accordingly, because the other appropriate computed values are used, corresponding threshold values and ranges are also within the scope of the present disclosure.

In another embodiment, the first computing process is a computation of maximum difference, and the second computing process is a computation of minimum. In the step S104, minimums of the SIRs are conditions for determination, i.e., the second computed SIRs are minimums of the SIRs of every antenna combination, and the first threshold value TH0 is set as 36 dB. In the steps S106 and S110, maximum differences of the SIRs are conditions for determination, i.e., the first computed SIRs are maximum differences of the SIRs of every antenna combination, and the first range is set between 10 dB and 20 dB. In the steps S114 and S116, maximum differences of the RSSI values are conditions for determination, i.e., the first computed RSSI values are maximum differences of the RSSI values of every antenna combination, and the second range is set between 10 dB and 20 dB. Compared to computation of RMSD and computation of mean, computation of minimum and computation of maximum difference have less complexity. Therefore, embodiment that uses minimums and maximum differences is less time consuming so as to improve executing efficiency of the autonomous radio system.

Through the aforementioned determination process of multi-switching antenna combination and checking, the present disclosure selects appropriate antenna combination from an antenna array according to environment conditions, and controls an autonomous radio system to operate in an appropriate mode to adapt to variable environment conditions. Therefore, the present disclosure can cooperate with an antenna with unknown characteristics in the environment, and doesn't need to set antenna characteristics and related parameters in the system when the autonomous radio system is built initially, which improves flexibility in application of the system. Even when an antenna in the antenna array malfunctions and causes abnormal operation or stopping operation, another appropriate antenna combination can also be selected through the aforementioned determination process without resulting in stopping operation of the whole system and system parameters are not needed to be reset.

Figure 2:
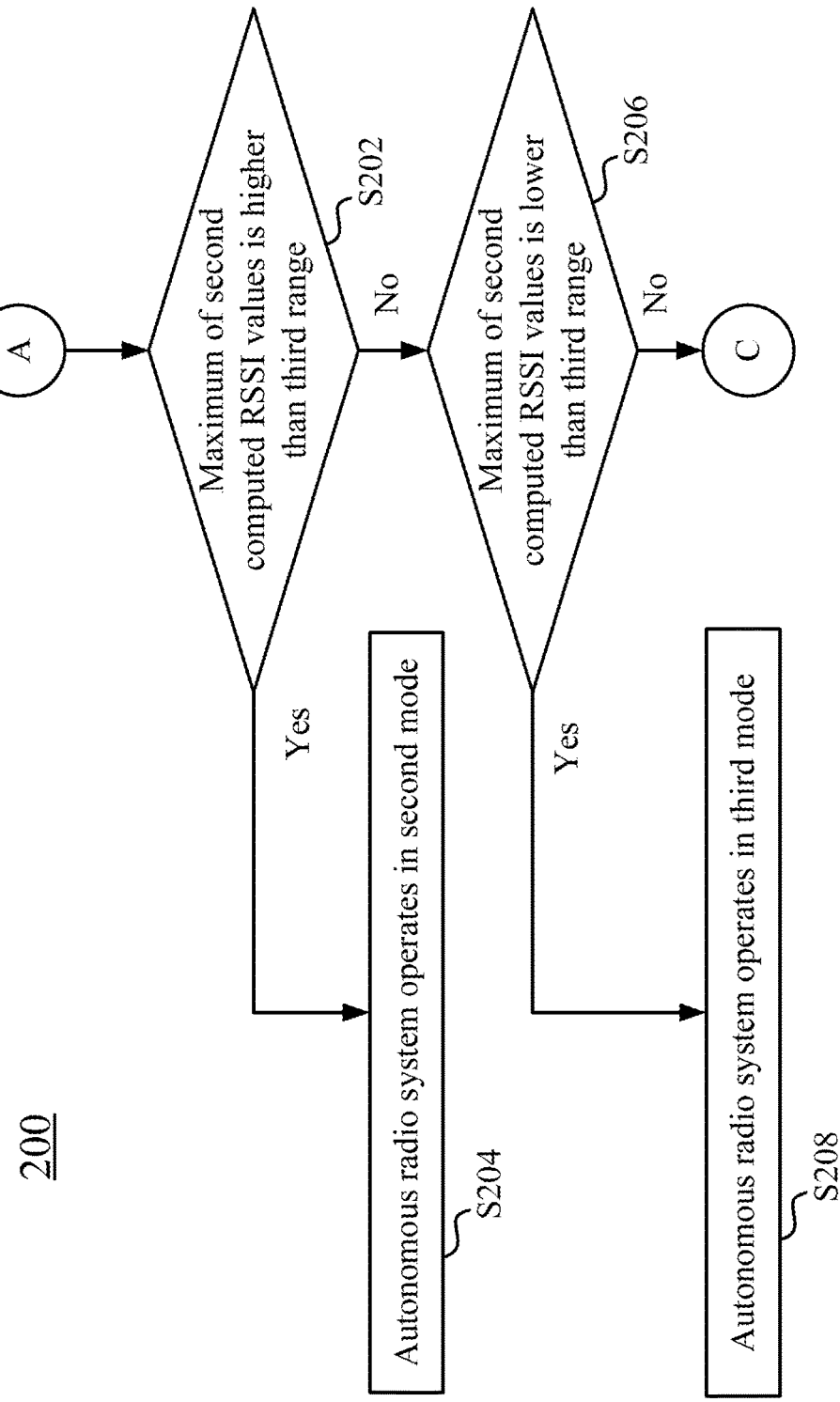
FIG. 2 is a flow chart of an autonomous radio controlling method according to an embodiment of the present disclosure.

Please refer to FIG. 2. FIG. 2 is a flow chart of an autonomous radio controlling method 200 according to an embodiment of the present disclosure, and connected to FIG. 1 at point A. The autonomous radio control method 200 includes a plurality of steps S202-S208 and can be implemented by autonomous radio systems 500, 600 as shown in FIGS. 5 and 6. However, those skilled in the art should understand that the sequence of the steps in the present embodiment can be adjusted according to actual needs unless is specified. All or parts of the steps can even be executed simultaneously.

In step S116, if the minimum of the RMSDs of the RSSI values is within the second range, e.g., between 10 dB and 20 dB, it indicates that the present antenna combination has medium signal coverage reliability. In step S202, for coverage edge expansion of signal quality, means of RSSI values are conditions for determination, i.e., second computed RSSI values are the means of the RSSI values. When a maximum of the means of the RSSI values of every antenna combination is higher than a third range, i.e., the maximum is higher than an upper limit HTH4-2 (e.g., −23 dBm) of the third range, it indicates that coverage of the antenna combination is broad. Therefore, in the step S204, the autonomous radio system selects a antenna combination with the maximum of the means of the RSSI values, and operate in the large-number stream spatial multiplexing (SM) mode (second mode), i.e., the high-rank MIMO mode (e.g., a spatial multiplexing (SM) mode that numbers of transmit antennas and receive antennas are 4 (4×4 SM)).

If in the step S202, the maximum of the means of the RSSI values is not higher than the third range, i.e., the maximum is lower than the upper limit HTH4-2 of the third range, then in the step S206, a determination is made whether the maximum of the means of the RSSI values is lower than the third range. If the maximum of the means of the RSSI values is lower than the third range, i.e., the maximum is lower than a lower limit LTH3-2 (e.g., −79 dBm) of the third range, it indicates that coverage of the present antenna combination is not broad. Therefore, in the step S208, the autonomous radio system selects an antenna combination with the maximum of the means of the RSSI values, and operates in the single stream beam forming (BF) mode (third mode). The present embodiment can check whether client station is over coverage through the RSSI values, operate in the beam forming mode that uses peaking to improve valid coverage for the client station, and use nulling to eliminate interferences or noises.

The present embodiment uses the means of the RSSI values as the determine conditions for determination. When the maximum of the means of the RSSI values is higher than the third range, it indicates that the present antenna combination has high signal strength, and then the autonomous radio system is controlled to operate in the large-number stream spatial multiplexing (SM) mode to improve transmission efficiency. When the maximum of the means of the RSSI values is lower than the third range, it indicates that signal strength is low, and then the autonomous radio system is controlled to operate in the single stream beam forming mode to reduce interferences. In the present embodiment, the second computing process is a computation of mean. The computed means in the autonomous radio control method 200 are for illustrative purposes only, and other appropriate computed values are also within the scope of the present disclosure. Accordingly, because the other appropriate computed values are used, corresponding threshold values and ranges are also within the scope of the present disclosure.

In another embodiment, the second computing process is a computation of minimum. In the steps S202 and S206, minimums of the RSSI values are determine conditions for determination, i.e., the second computed RSSI values are minimums of the RSSI values, and the third range is set between −89 dBm and −33 dBm. Compared to computation of mean, computation of minimum has less complexity. Therefore, embodiment that uses minimums is less time consuming so as to improve executing efficiency.

Figure 3:
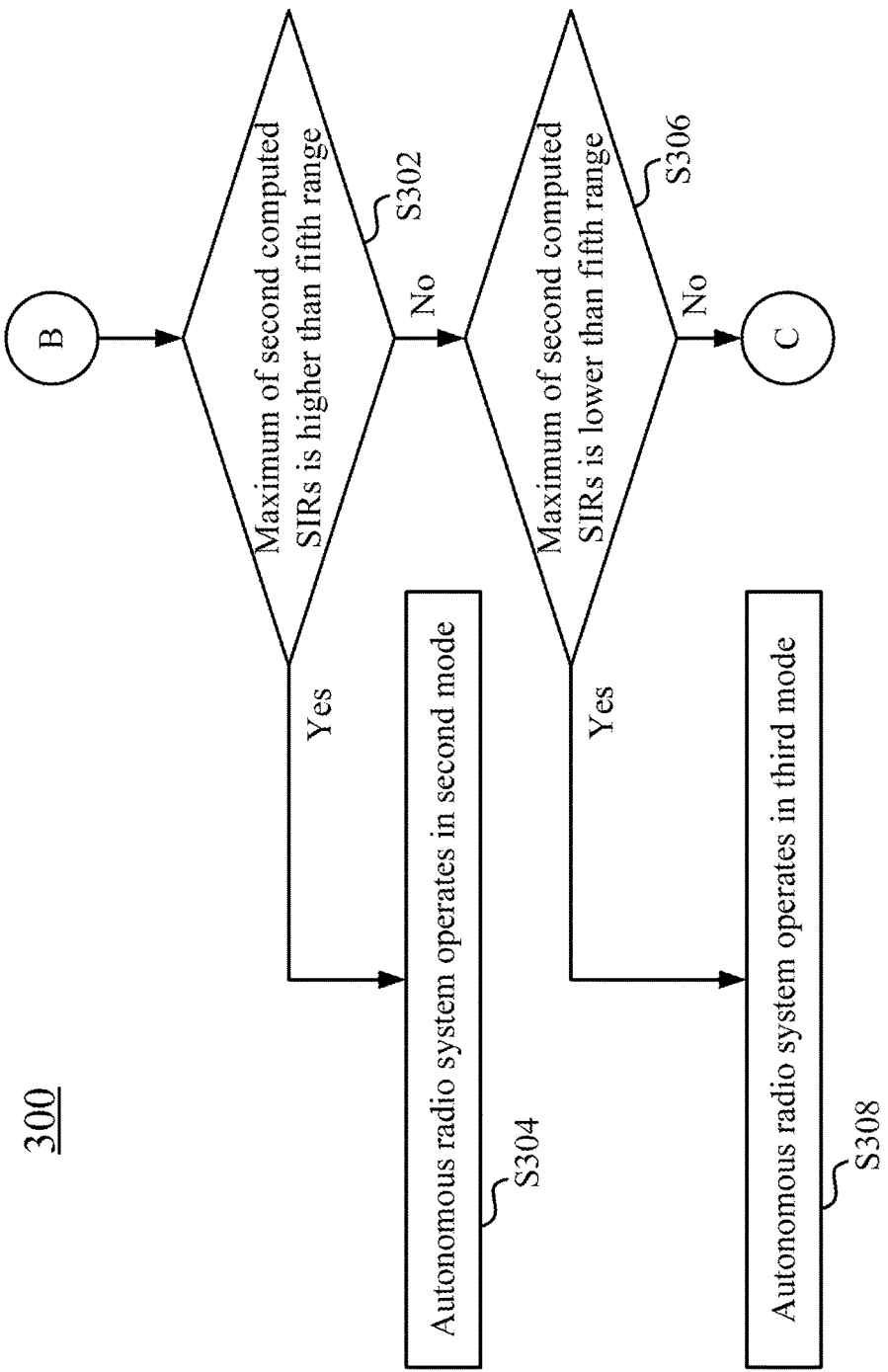
FIG. 3 is a flow chart of an autonomous radio controlling method according to an embodiment of the present disclosure.

Please refer to FIG. 3. FIG. 3 is a flow chart of an autonomous radio controlling method 300 according to an embodiment of the present disclosure, and connected to FIG. 1 at point B. The autonomous radio control method 300 includes a plurality of steps S302-S308 and can be implemented by autonomous radio systems 500, 600 as shown in FIGS. 5 and 6. However, those skilled in the art should understand that the sequence of the steps in the present embodiment can be adjusted according to actual needs unless is specified. All or parts of the steps can even be executed simultaneously.

In the step S110, if the minimum of the RMSDs of the SIRs is within the first range, e.g., between 10 dB and 20 dB, it indicates that the present antenna combination has medium compatibility reliability. In step S302, for interference immunity of signal quality, means of SIRs are determine conditions for determination, i.e., the means of the SIRs of every antenna combination are second computed SIRs. When a maximum of the means of the SIRs of the antenna combinations is higher than a fifth range, i.e., the maximum is higher than an upper limit HTH4-1 (e.g., 72 dB) of the fifth range, it indicates that interference immunity of the present antenna combination is good. Therefore, in step S304, the autonomous radio system selects an antenna combination with the maximum of the means of the SIRs, and operates in the large-number stream spatial multiplexing (SM) mode (second mode), i.e., the high-rank MIMO mode (e.g., a spatial multiplexing (SM) mode that numbers of transmit antennas and receive antennas are 4 (4×4 SM)).

If in the step S302, the maximum of the means of the SIRs is not higher than the fifth range, i.e., the maximum is lower than the upper limit HTH4-1 of the fifth range, then in step S306, a determination is made whether the maximum of the means of the SIRs is lower than the fifth range. If the maximum of the means of the SIRs is lower than the fifth range, i.e., the maximum is lower than a lower limit LTH3-1 (e.g., 16 dB) of the fifth range, it indicates that interference immunity of the antenna combination is not good. Therefore, in step S308, an antenna combination with the maximum of the means of the SIRs is selected, and the autonomous radio system is controlled to operate in the single stream beam forming mode (third mode). The present embodiment can check whether there is a rogue station within the coverage through SIRs, and operate in the beam forming mode that uses nulling to reduce valid coverage for rogue stations or interference sources.

The present embodiment uses the means of the SIRs as the determine conditions for determination. When the maximum of the means of the SIRs is higher than the fifth range, it indicates that interference immunity is good, and then the autonomous radio system is controlled to operate in the large-number stream spatial multiplexing (SM) mode. When the maximum of the means of the SIRs is lower than the fifth range, it indicates that interference immunity is not good, and then the autonomous radio system is controlled to operate in the single stream beam forming mode. In the present embodiment, the second computing process is a computation of mean. The computed means used in the autonomous radio control method 300 are for illustrative purposes only, and other appropriate computed values are also within the scope of the present disclosure. Accordingly, because the other appropriate computed values are used, corresponding threshold values and ranges are also within the scope of the present disclosure.

In another embodiment, the second computing process is a computation of minimum. In the steps S302 and S306, minimums of the SIRs are determine conditions for determination, i.e., the second computed SIRs are minimums of the SIRs, and the fifth range is set between 6 dB and 62 dB. Compared to computation of mean, computation of minimum has less complexity. Therefore, embodiment that uses minimums is less time consuming so as to improve executing efficiency.

Figure 4:
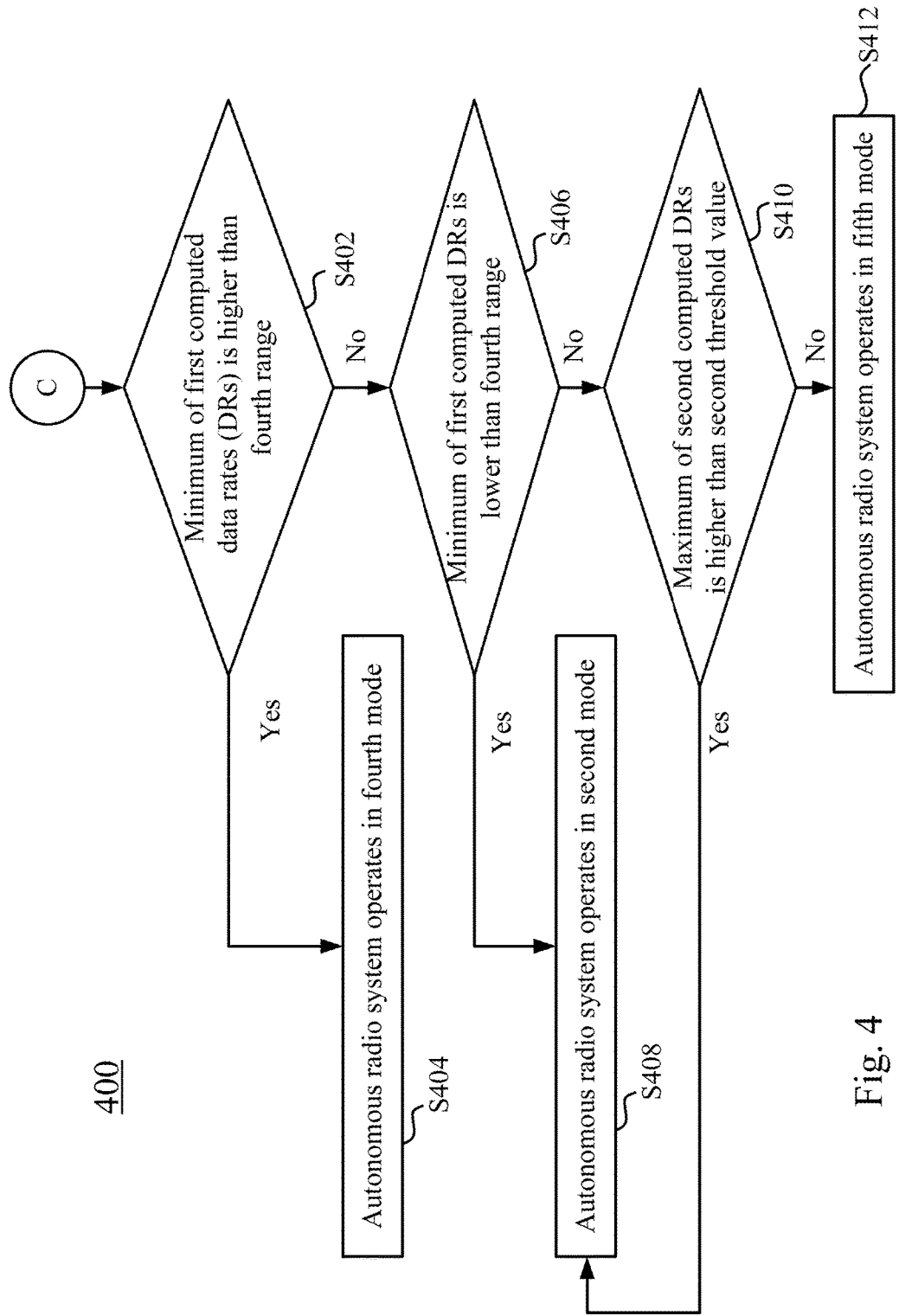
FIG. 4 is a flow chart of an autonomous radio controlling method according to an embodiment of the present disclosure.

Please refer to FIG. 4. FIG. 4 is a flow chart of an autonomous radio controlling method 400 according to an embodiment of the present disclosure, and connected to FIGS. 2 and 3 at point C. The autonomous radio control method 400 includes a plurality of steps S402-S412 and can be implemented by autonomous radio systems 500, 600 as shown in FIGS. 5 and 6. However, those skilled in the art should understand that the sequence of the steps in the present embodiment can be adjusted according to actual needs unless is specified. All or parts of the steps can even be executed simultaneously.

When all possible antenna combinations are switched or scanned one by one, computed data rates (DRs) that represents characteristics of every antenna combinations are computed according to DRs of every antenna. For example, the computed DRs can be a sum, a mean, a root mean square deviation (RMSD), a normalized RMSD, a minimum, a maximum difference, or a normalized maximum difference of every antenna DR in the antenna combination, or other computed values according to the RSSI values. For example, the aforementioned normalized RMSD of the DRs is every RMSD of the DRs of the antenna combination divided by a mean of the DRs. The aforementioned normalized maximum difference of the DRs is every maximum difference of the DRs of the antenna combinations divided by a mean of the DRs.

If the maximum of the means of the RSSI values in the step S206, or the maximum of the means of the SIRs in the step S306 are within the third range and the fifth range respectively, then in step S402, main consideration is capacity reliability of link reliability, and RMSDs of DRs are determine conditions for determination, i.e., first computed DRs are RMSDs of DRs. When a minimum of the RMSDs of the DRs of the antenna combinations is higher than the fourth range, i.e., an upper limit HTH5 (e.g., 80 Mbps) of the fourth range, it indicates that capacity reliability of the present antenna combination is not good. Therefore, in step S404, the autonomous radio system selects an antenna combination with the minimum of the RMSDs of the DRs, and operates in a small-number stream spatial multiplexing (SM) mode (fourth mode), i.e., a low-rank MIMO mode (e.g., a spatial multiplexing (SM) mode that numbers of transmit antennas and receive antennas are 2 (2×2 SM)).

If in the step S402, the minimum of the RMSDs of the DRs is not higher than the fourth range, i.e., the minimum is lower than the upper limit HTH5 of the fourth range, then in step S406, a determination is made whether the minimum of the RMSDs of the DRs is lower than the fourth range. If the minimum of the RMSDs of the DRs is lower than the fourth range, i.e., the minimum is lower than a lower limit LTH6 (e.g., 40 Mbps) of the fourth range, it indicates that capacity reliability of the present antenna combination is good. Therefore, in step S408, the autonomous radio system selects an antenna combination with the minimum of the RMSDs of the DRs, and operates in the large-number stream spatial multiplexing (SM) mode (second mode), i.e., the high-rank MIMO mode (e.g., a spatial multiplexing (SM) mode that numbers of transmit antennas and receive antennas are 4 (4×4 SM)).

If in the step S406, the minimum of the RMSDs of the DRs is within the fourth range, e.g., between 40 Mbps and 80 Mbps, it indicates that the present antenna combination has medium capacity reliability. In step S410, for spectrum efficiency enhancement of link quality, then means of the DRs are determine conditions for determination, i.e., second computed DRs are the means of the DRs. When a maximum of the means of the DRs of the antenna combination is higher than a second threshold value TH7 (e.g., 220 Mbps), it indicates that spectrum efficiency of the present antenna combination is good. Therefore, in step S408, the autonomous radio system selects an antenna combination with the maximum of the means of the DRs, and operates in the large-number stream spatial multiplexing (SM) mode (second mode), i.e., the high-rank MIMO mode (e.g., a spatial multiplexing (SM) mode that numbers of transmit antennas and receive antennas are 4 (4×4 SM)).

If in the step S410, the maximum of the means of the DRs is not higher than the second threshold value TH7, i.e., the maximum is lower than the second threshold value TH7 (e.g., 220 Mbps), it indicates that of capacity reliability the present antenna combination is not good. Therefore, in step S412, the autonomous radio system selects an antenna combination with the maximum of the means of the DRs, and operates in a medium-number stream spatial multiplexing (SM) mode (fifth mode), i.e., a mid-rank MIMO mode (e.g., a spatial multiplexing (SM) mode that numbers of transmit antennas and receive antennas are 3 (3×3 SM)).

The present embodiment uses the RMSDs of the DRs as the determine conditions for determination. When the minimum of the RMSDs of the DRs is higher than the fourth range, it indicates that capacity reliability of the present antenna combination is not good, and then the autonomous radio system is controlled to operate in the small-number stream spatial multiplexing (SM) mode. When the minimum of the RMSDs of the DRs is lower than the fourth range, it indicates that capacity reliability of the present antenna combination is good, and then the autonomous radio system is controlled to operate in the large-number stream spatial multiplexing (SM) mode. When the minimum of the RMSDs of the DRs is within the fourth range, it indicates that the present antenna combination has medium capacity reliability. Then, the present embodiment uses the means of the DRs as the determine conditions for determination. When the maximum of the means of the DRs is higher than the second threshold value, it indicates that spectrum efficiency is good, and then the autonomous radio system is controlled to operate in the large-number stream spatial multiplexing (SM) mode. When the maximum of the means of the DRs is lower than the second threshold value, it indicates that spectrum efficiency of the present antenna combination is not good, and then the autonomous radio system is controlled to operate in the medium-number stream spatial multiplexing (SM) mode. In the present embodiment, first computing process is a computation of RMSD, and second computing process is a computation of mean. The computed means and the computed RMSDs in the autonomous radio control method 400 are for illustrative purposes only, and other appropriate computed values are also within the scope of the present disclosure. Accordingly, because the other appropriate computed values are used, corresponding threshold values and ranges are also within the scope of the present disclosure.

In another embodiment, the first computing process is a computation of maximum difference, and the second computing process is a computation of minimum. In the steps S402 and S406, maximum differences of the DRs are conditions for determination, i.e., the first computed DRs are maximum differences of the DRs, and the fourth range is set between 40 Mbps and 80 Mbps. In the step S410, minimums of the DRs are conditions for determination, i.e., the second computed DRs are minimums of the DRs, and the second threshold value TH7 is set as 110 Mbps. Compared to computation of RMSD and computation of mean, computation of minimum and computation of maximum difference have less complexity. Therefore, embodiment that uses minimums and maximum differences is less time consuming so as to improve executing efficiency of the autonomous radio system.

The sequences of the autonomous radio control methods 100-400 and selections of the determine conditions for determination are for illustrative purposes only and not used to limit the present disclosure. Based on other considerations, adjustments in the sequences of the executing steps or selection of different values as the determine conditions for determination are also within the scope of the present disclosure. For example, as shown in Table 1, for coverage edge expansion of signal quality, an optimal RSSI value is the determine condition for determination of antenna selection, and the system is controlled to operate in a (single stream) beam forming mode. For interference immunity of signal quality, an optimal SIR is the determine condition for determination of antenna selection, and the system is controlled to operate in an interference nulling mode.

Alternatively, for example, for coverage reliability of signal reliability, an optimal RMSD of RSSI values is the determine condition for determination of antenna selection, and the system is controlled to operate in a (single stream) spatial diversity (SD) mode. For compatibility reliability of signal reliability, an optimal RMSD of SIRs is the determine condition for determination of antenna selection, and the system is controlled to operate in an interference cancellation mode.

Alternatively, for example, for spectrum efficiency enhancement of link quality, an optimal DR is the determine condition for determination of antenna selection, and the system is controlled to operate in a (large-number multi-stream) spatial multiplexing (SM) mode. For jammer immunity of link quality, an optimal throughput is the determine condition for determination of antenna selection, and the system is controlled to operate in a jammer blocking mode. For spectrum efficiency enhancement of link quality, an optimal packet loss rate is the determine condition for determination of antenna selection, and the system is controlled to operate in a (large-number multi-stream) spatial multiplexing (SM) mode. For multi-user spectrum efficiency enhancement of link quality, an optimal total or gross data rate (DR) is the determine condition for determination of antenna selection, and the system is controlled to operate in a space-division multiple access (SDMA) mode.

Alternatively, for example, for capacity reliability growth of link reliability, an optimal RMSD of DRs is the determine condition for determination of antenna selection, and the system is controlled to operate in a (small-number multi-stream) spatial multiplexing (SM) mode. For coexistence reliability growth of link reliability, an optimal RMSD of throughputs is the determine condition for determination of antenna selection, and the system is controlled to operate in a jammer suppression mode. For capacity reliability growth of link reliability, an optimal RMSD of packet loss rates is the determine condition for determination of antenna selection, and the system is controlled to operate in a (small-number multi-stream) spatial multiplexing reliable mode. For multi-user capacity reliability growth of link reliability, an optimal total or gross DR is the determine condition for determination of antenna selection, and the system is controlled to operate in a space-division multiple access (SDMA) reliable mode.

Alternatively, for example, for flow efficiency enhancement of quality of service (QoS), an optimal latency is the determine condition for determination of antenna selection, and the system is controlled to operate in a (large-number multi-stream) spatial multiplexing (SM) and spectrum aggregation mode. For multi-user flow efficiency enhancement of QoS, an optimal total or gross latency is the determine condition for determination of antenna selection, and the system is controlled to operate in a space-division multiple access (SDMA) and radio resource management (RRM) mode.

Alternatively, for example, for traffic reliability growth of reliability of service, an optimal RMSD of latencies, i.e., jitter, is the determine condition for determination of antenna selection, and the system is controlled to operate in a (small-number multi-stream) spatial multiplexing (SM) and spectrum aggregation reliable mode. For multi-user traffic reliability growth of reliability of service, an optimal RMSD of total or gross latencies, i.e., total jitter, is the determine condition for determination of antenna selection, and the system is controlled to operate in a space-division multiple access (SDMA) and radio resource management (RRM) reliable mode.

The present disclosure can select corresponding determine conditions for determination and adjust sequence of determination appropriately to select antennas and control operation mode of system according to one of the aforementioned purposes or a combination thereof. Therefore, the autonomous radio system can use antennas with well-known or unknown characteristics to maintain operation in variable environment. When parts of antennas malfunction and cannot be used, or an antenna is replaced, the present disclosure can also select another better antenna combination and operation mode to avoid interruption the system operation through the aforementioned embodiments. The aforementioned autonomous radio control method are also applicable to but not limited to an access point (AP), a base station, a base transceiver station (BTS), a node B (NB), or an evolved node B (eNB).

TABLE 1

| Criterion | Signal quality | |
|---|---|---|
| Request | High signal-strength downloading | High SIR downloading |
| Purpose | Coverage edge expansion | Interference immunity |
| Condition of antenna selection | RSSI | RSSI/Noise Floor |
| Set MIMO/ Modulation and Coding Scheme (MCS) | (Single-stream) beam forming | Interference nulling |

| Criterion | Signal reliability | |
|---|---|---|
| Request | Low signal-strength RMSD downloading | Low SIR RMSD downloading |
| Purpose | Coverage reliability growth | Compatibility reliability growth |
| Condition of antenna selection | RSSI RMSD | RSSI/Noise Floor RMSD |
| Set MIMO/ Modulation and Coding Scheme (MCS) | (Single-stream) spatial diversity | Interference cancellation |

| Criterion | Link quality | | | |
|---|---|---|---|---|
| Request | High DR streaming | High throughput streaming | Low PLR streaming | Multi-user high DR streaming |
| Purpose | Spectrum efficiency enhancement | Jammer immunity | Spectrum efficiency enhancement | Multi-user spectrum efficiency enhancement |
| Condition of antenna selection | Data Rate (DR) | Throughput | Packet Loss Rate (PLR) | Total or gross DR |
| Set MIMO/ Modulation and Coding Scheme (MCS) | (Large-number multi-stream) spatial multiplexing (SM) | Jammer blocking | (Large-number multi-stream) spatial multiplexing (SM) | Space-division multiple access (SDMA) |

| Criterion | Link reliability | | | |
|---|---|---|---|---|
| Request | Low DR RMSD streaming | Low throughput RMSD streaming | Low PLR RMSD streaming | Multi-user Low DR RMSD streaming |
| Purpose | Capacity reliability growth | Coexistence reliability growth | Capacity reliability growth | Multi-user capacity reliability growth |
| Condition of antenna selection | DR RMSD | Throughput RMSD | PLR RMSD | Total or gross DR RMSD |
| Set MIMO/ Modulation and Coding Scheme (MCS) | (Small-number multi-stream) spatial multiplexing (SM) reliable | Jammer suppression | (Small-number multi-stream) spatial multiplexing (SM) reliable | SDMA reliable |

FIG. 5 is a schematic diagram of an autonomous radio system 500 according to an embodiment of the present disclosure. The autonomous radio system 500 includes a beam processing network (BPN) 510 and an access point (AP) device 520, in which the access point device 520 is coupled to the beam processing network 510, and the beam processing network 510 is coupled to an antenna array 530.

The beam processing network 510 can include one of an antenna switching network, a beam forming network, and a beam switching network, or combination thereof. The beam processing network 510 is configured to process antenna signals that number of the antenna signals is more than number of beam ports. Frequency coverage of the beam processing network 510 includes low-band and high-band simultaneously. The access point device 520 can include a RF frontend, a transceiver and a processor, and interior of the access point device 520 is grouped according to frequency band. Algorithm is built in the access point device 520 to control the beam processing network 510 to switch a plurality of antenna combinations of the antenna array 530, and receive RSSI values and NF values of every antenna combination. The access point device 520 executes the aforementioned autonomous radio control methods 100-400 through the built-in algorithm, and the description is not repeated herein.

Characteristics of antennas in the antenna array 530 can be well known or unknown. For example, frequency coverage of the antennas can be but not limited to single low-band, single high-band, dual low/high-band, or wideband that covers low-band and high-band. Polarization of the antennas can be but not limited to single co-polarized, single cross-polarized, dual-orthogonally polarized or non-polarized. The antennas can be but not limited to non-grouped or grouped according to frequency band.

In order to structure of an autonomous radio system in detail, FIG. 6 is a schematic diagram of an autonomous radio system 600 according to an embodiment of the present disclosure. The beam processing network 510 includes frequency duplexers 612, switches 613 and 614, beam forming networks 615 and 616, and switches 617 and 618 to filter signals as low-band signals and high-band signals, and number of the signals is reduced from number of antennas 632 to number of beam ports. The access point device 520 includes RF frontends and transceivers 622 and 624 and a processor 626, in which the RF frontends and transceivers is grouped into low-band RF frontends and transceivers 622 and high-band RF frontends and transceivers 624. As shown in FIG. 6, low-band signals with solid lines are selected and processed into two low-band beams by the switches 613, the beam forming networks 615 and the switches 617. Similarly, high-band signals with dashed lines are selected and processed into two high-band beams by the switches 614, the beam forming networks 616 and the switches 618. The two low-band beams and the two high-band beams are coupled to the access point device 520 through two low-band beam ports and two high-band beam ports respectively. Specifically, the low-band beam ports are coupled to the low-band RF frontends and transceivers 622, and the high-band beam ports are coupled to the high-band RF frontends and transceivers 624. The low-band RF frontends and transceivers 622 and the high-band RF frontends and transceivers 624 are coupled to the processor 626. In practice, the frequency duplexers 612 can be replaced as but not limited to multiplexers or jumping wires. The beam forming network 616 can be implemented by but not limited to combination of a power divider, a hybrid coupler, a Butler matrix and/or jumping wires. The above-mentioned processor 626 can be implemented as software, hardware and/or firmware. For example, if the execution speed and accuracy is a primary consideration, then the processor 626 can be mainly selected from hardware and/or software; if the design flexibility is a primary consideration, then the processor 626 can be mainly selected from software; and alternatively, the processor 626 can make use of software, hardware and firmware cooperatively. It should be known that, the above-mentioned examples are not classified as better or worse and they are not used to limit the invention. Those of skills in the art can flexibly select the specific implementation for the processor 626, depending on the current demand. In one embodiment, algorithm is built in the processor 626 to execute the aforementioned autonomous radio control method 100-400, and the description is not repeated herein.

Through the aforementioned determination process of multi-checking, the present disclosure selects appropriate antenna combination, and controls an autonomous radio system to operate in an appropriate mode to adapt to variable environment conditions. Even when an antenna in the antenna array malfunctions and causes abnormal operation or stopping operation, another appropriate antenna combination can also be selected through the aforementioned determination process without resulting in stopping operation of the whole system and system parameters are not needed to be reset.

Figure 7:
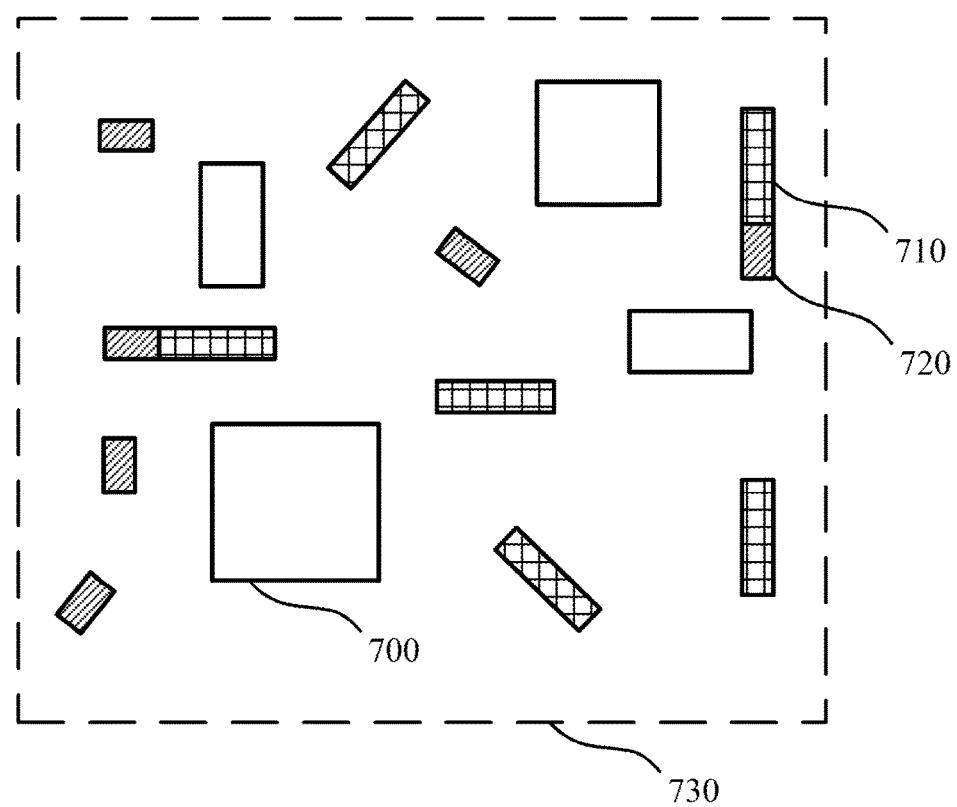
FIG. 7 is a schematic diagram of spatial arrangement of an autonomous radio system and antennas according to an embodiment of the present disclosure.

FIG. 7 is a schematic diagram of spatial arrangement of an autonomous radio system 700 and antennas according to an embodiment of the present disclosure. In environment 730, spatial arrangement of the autonomous radio system 700, antennas 710 and antennas 720 is not limited to particular rule of arrangement. As shown in FIG. 7, the antennas 710 and the antennas 720 with the same or different characteristics are deposed in the environment 730 arbitrarily. The autonomous radio system 700 can select appropriate antenna combination, and be controlled to operate in an appropriate mode according to antennas 710 and 720 deposed in the environment 730 by switching connection to transceivers and computations and comparisons of the processor. Therefore, whether the antennas 710 and 720 in the antenna array are deposed according to a particular rule of arrangement or not, the autonomous radio system 700 is applicable and then improves flexibility of hardware configuration.

In conclusion, through the aforementioned embodiments, the present disclosure can execute categorizations of reliability and quality on the antenna combinations according to the computed SIRs and the computed RSSI values of different antenna combinations in the antenna array, and control the autonomous radio system to operate in a corresponding operation mode according to the categorizations, in order to adapt to variable environment conditions flexibly. Therefore, the present disclosure is applicable to antennas with well-known or unknown characteristics, and the antennas can be deposed regularly or irregularly in the environment. Even when an antenna in the antenna array malfunctions and causes abnormal operation or stopping operation, another appropriate antenna combination can also be selected through the aforementioned determination process without resulting in stopping operation of the whole system and system parameters are not needed to be reset.

The present disclosure is applicable to but not limited to IEEE 802.11 standards, third generation partnership project-long-term evolution (3GPP-LTE) standards, or any standards of next generation wireless local area network (WLAN) and next generation Cellular Network.

Even though the present disclosure is disclosed as above, the disclosure is not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. An autonomous radio controlling method, comprising:
switching a plurality of antenna combinations in an antenna array;
processing a plurality of signal-to-interference ratios (SIRs) and a plurality of received signal strength indicator (RSSI) values of the antenna combinations through a first computing process respectively to generate a plurality of first computed SIRs and a plurality of first computed RSSI values;
processing the SIRs through a second computing process to generate a plurality of second computed SIRs;
determining a relation between a minimum of the second computed SIRs and a first threshold value;
further determining a relation between a minimum of the first computed SIRs and a first range if the minimum of the second computed SIRs is lower than the first threshold value; controlling an autonomous radio system to operate in a first mode if the minimum of the first computed SIRs is higher than the first range; controlling an autonomous radio system to operate in a second mode if the minimum of the first computed SIRs is lower than the first range;
further determining a relation between a minimum of the first computed RSSI values and a second range if the minimum of the second computed SIRs is higher than the first threshold value; and
controlling the autonomous radio system to operate in the first mode if the minimum of the first computed RSSI values is higher than the second range; controlling the autonomous radio system to operate in the second mode if the minimum of the first computed RSSI values is lower than the second range.

2. The autonomous radio controlling method of claim 1, further comprising:
processing the RSSI value through the second computing process to generate a plurality of second computed RSSI values;
further determining a relation between a maximum of the second computed RSSI values and a third range if the minimum of the first computed RSSI values is within the second range; and
controlling the autonomous radio system to operate in the second mode if the maximum of the second computed RSSI values is higher the third range; controlling the autonomous radio system to operate in a third mode if the maximum of the second computed RSSI values is lower than the third range.

3. The autonomous radio controlling method of claim 2, further comprising:
processing a plurality of data rates (DRs) of the antenna combinations through the first computing process to generate a plurality of first computed DRs;
further determining a relation between a minimum of the first computed DRs and a fourth range if the maximum of the second computed RSSI values is within the third range; and
controlling the autonomous radio system to operate in a fourth mode if the minimum of the first computed DRs is higher than the fourth range; controlling the autonomous radio system to operate in the second mode if the minimum of the first computed DRs is lower than the fourth range.

4. The autonomous radio controlling method of claim 3, further comprising:
processing the DRs through the second computing process to generate a plurality of second computed DRs;
further determining a relation between a maximum of the second computed DRs and a second threshold value if the minimum of the first computed DRs is within the fourth range; and
controlling the autonomous radio system to operate in the second mode if the maximum of the second computed DRs is higher than the second threshold value; controlling the autonomous radio system to operate in a fifth mode if the maximum of the second computed DRs is lower than the second threshold value.

5. The autonomous radio controlling method of claim 4, wherein the first mode is a spatial diversity (SD) mode, the second mode is a large-number stream spatial multiplexing (SM) mode, the third mode is a single stream beam forming (BF) mode, the fourth mode is a small-number stream spatial multiplexing mode, and the fifth mode is a medium-number stream spatial multiplexing mode.

6. The autonomous radio controlling method of claim 1, further comprising:
further determining a relation between a maximum of the second computed SIRs and a fifth range if the minimum of the first computed SIRs is within the first range; and
controlling the autonomous radio system to operate in the second mode if the maximum of the second computed SIRs is higher than the fifth range; controlling the autonomous radio system to operate in a third mode if the maximum of the second computed SIRs is lower than the fifth range.

7. The autonomous radio controlling method of claim 6, further comprising:
processing a plurality of DRs of the antenna combinations through the first computing process to generate a plurality of first computed DRs;
further determining a relation between a minimum of the first computed DRs and a fourth range if the maximum of the second computed SIRs is within the fifth range; and
controlling the autonomous radio system to operate in a fourth mode if the minimum of the first computed DRs is higher than the fourth range; controlling the autonomous radio system to operate in the second mode if the minimum of the first computed DRs is lower than the fourth range.

8. The autonomous radio controlling method of claim 7, further comprising:
processing the DRs through the second computing process to generate a plurality of second computed DRs;
further determining a relation between a maximum of the second computed DRs and a second threshold value if the minimum of the first computed DRs is within the fourth range; and
controlling the autonomous radio system to operate in the second mode if the maximum of the second computed DRs is higher than the second threshold value; controlling the autonomous radio system to operate in a fifth mode if the maximum of the second computed DRs is lower than the second threshold value.

9. The autonomous radio controlling method of claim 8, wherein the first mode is a spatial diversity (SD) mode, the second mode is a large-number stream spatial multiplexing (SM) mode, the third mode is a single stream beam forming (BF) mode, the fourth mode is a small-number stream spatial multiplexing mode, and the fifth mode is a medium-number stream spatial multiplexing mode.

10. The autonomous radio controlling method of claim 1, wherein the first computing process is a computation of root mean square deviation, and the second computing process is a computation of mean.

11. The autonomous radio controlling method of claim 1, wherein the first computing process is a computation of maximum difference, and the second computing process is a computation of minimum.

12. An autonomous radio system, comprising:
a beam processing network (BPN), configured to switch a plurality of antenna combinations in an antenna array; and
an access point device, coupled to the BPN and configured to execute following steps:
processing a plurality of signal-to-interference ratios (SIRs) and a plurality of received signal strength indicator (RSSI) values of the antenna combinations through a first computing process respectively to generate a plurality of first computed SIRs and a plurality of first computed RSSI values;
processing the SIRs through a second computing process to generate a plurality of second computed SIRs;
determining a relation between a minimum of the second computed SIRs and a first threshold value;
further determining a relation between a minimum of the first computed SIRs and a first range if the minimum of the second computed SIRs is lower than the first threshold value; controlling an autonomous radio system to operate in a first mode if the minimum of the first computed SIRs is higher than the first range; controlling the autonomous radio system to operate in a second mode if the minimum of the first computed SIRs is lower than the first range;
further determining a relation between a minimum of the first computed RSSI values and a second range if the minimum of the second computed SIRs is higher than the first threshold value; and
controlling the autonomous radio system to operate in the first mode if the minimum of the first computed RSSI values is higher than the second range; controlling the autonomous radio system to operate in the second mode if the minimum of the first computed RSSI values is lower than the second range.

\* \* \* \* \*